United States Patent
Xu

(10) Patent No.: US 12,231,314 B2
(45) Date of Patent: Feb. 18, 2025

(54) WIRELESS COMMUNICATION METHOD, TERMINAL DEVICE, AND SERVER

(71) Applicant: GUANGDONG OPPO MOBILE TELECOMMUNICATIONS CORP., LTD., Dongguan (CN)

(72) Inventor: Yang Xu, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 17/860,955

(22) Filed: Jul. 8, 2022

(65) Prior Publication Data
US 2022/0345383 A1  Oct. 27, 2022

Related U.S. Application Data

(63) Continuation of application No. PCT/CN2020/108274, filed on Aug. 10, 2020.

(51) Int. Cl.
*H04L 43/08* (2022.01)

(52) U.S. Cl.
CPC .................. *H04L 43/08* (2013.01)

(58) Field of Classification Search
CPC .......... H04L 43/08; H04W 8/186; H04W 8/24
See application file for complete search history.

(56) References Cited

U.S. PATENT DOCUMENTS

| | | | | |
|---|---|---|---|---|
| 6,859,798 B1* | 2/2005 | Bedell | ...................... | G06N 5/02 706/45 |
| 9,043,355 B1* | 5/2015 | Kapoor | ................. | G06F 16/242 707/769 |
| 9,660,930 B2* | 5/2017 | Vlachogiannis | ........ | H04L 67/75 |
| 9,781,148 B2* | 10/2017 | Mahaffey | .............. | H04W 12/02 |
| 10,424,034 B1* | 9/2019 | Wang | .................. | G06F 21/6263 |
| 2007/0289022 A1* | 12/2007 | Wittkotter | ............. | H04L 63/123 726/26 |
| 2014/0136608 A1* | 5/2014 | Lin | ..................... | G06F 16/9535 709/203 |

(Continued)

FOREIGN PATENT DOCUMENTS

| | | |
|---|---|---|
| CN | 102833351 A | 12/2012 |
| CN | 103096293 A | 5/2013 |

(Continued)

OTHER PUBLICATIONS

International Search Report and Written Opinion dated Apr. 27, 2021 in International Application No. PCT/CN2020/108274. English translation attached.

(Continued)

*Primary Examiner* — Ranodhi Serrao
(74) *Attorney, Agent, or Firm* — Sheppard, Mullin, Richter & Hampton LLP

(57) ABSTRACT

The embodiments of the present disclosure provide a wireless communication method, a terminal device, and a server. The method includes: obtaining, by a terminal device, at least one application data and/or wireless protocol layer data in the terminal device; and transmitting, by the terminal device, the at least one application data and/or wireless protocol layer data of the terminal device to a data collection server. Therefore, the accuracy of data analysis can be improved.

20 Claims, 4 Drawing Sheets

(56) References Cited

U.S. PATENT DOCUMENTS

| | | | | |
|---|---|---|---|---|
| 2014/0201332 A1* | 7/2014 | Kataoka | ............... | G06F 9/5088 709/219 |
| 2015/0244820 A1* | 8/2015 | Verkasalo | ............ | G06F 16/958 707/740 |
| 2016/0099963 A1* | 4/2016 | Mahaffey | ............ | H04L 63/166 726/25 |
| 2017/0052831 A1* | 2/2017 | Wu | .................... | G06F 11/3476 |
| 2017/0353565 A1* | 12/2017 | Kumar | ................... | H04L 67/02 |
| 2019/0235856 A1* | 8/2019 | Zhang | ...................... | G06F 8/65 |
| 2020/0160388 A1* | 5/2020 | Sabeg | ............... | G06Q 30/0269 |
| 2020/0329455 A1* | 10/2020 | Ryu | .................... | H04W 68/005 |
| 2021/0234713 A1* | 7/2021 | Nagasawa | ........... | H04L 67/1097 |

FOREIGN PATENT DOCUMENTS

| | | |
|---|---|---|
| CN | 103678417 A | 3/2014 |
| CN | 104683407 A | 6/2015 |
| CN | 104811482 A | 7/2015 |
| CN | 107453978 A | 12/2017 |
| CN | 107463853 A | 12/2017 |
| CN | 109995943 A | 7/2019 |
| CN | 110505160 A | 11/2019 |
| CN | 110769455 A | 2/2020 |
| CN | 111213347 A | 5/2020 |
| EP | 2741473 A1 | 6/2014 |
| WO | 2015021636 A1 | 2/2015 |
| WO | 2020020263 A1 | 1/2020 |

OTHER PUBLICATIONS

The Second Office Action from corresponding Chinese Application No. 202210977385.1, dated Oct. 25, 2023. English translation attached.

Communication pursuant to Article 94(3) EPC for European Application 20948953.3 mailed Nov. 30, 2023.

The First Office Action from corresponding Chinese Application No. 202210977385.1, dated Aug. 16, 2023 . English translation attached.

"3rd Generation Partnership Project; Technical Specification Group Services and System Aspects;5G Media Streaming (5GMS);General description and architecture(Release 16)" 3GPP TS 26.501 V16.2.0 (Dec. 2012).

"3rd Generation Partnership Project; Technical Specification Group Services and System Aspects;5G Media Streaming (5GMS);General description and architecture(Release 16)" 3GPP TS 26.501 V16.4.0 (Jun. 2020).

Ericsson, "KI #8, New Sol: Providing UE Analytics to the NWDAF via the User Plane" SA WG2 Meeting #139-e, S2-2003695,Jun. 1, 2020.

Extended European Search Report dated Mar. 13, 2023 received in European Patent Application No. EP20948953.3.

Qualcomm Incorporated :"User PlaneBased UE Data Collection", 3GPP Draft; S2-2003863, 3rd Generation Partnership Project (3GPP) , Mobile,Competence Centre ; 650, Route Des Lucioles ; F-06921 Sophia-Antipolis Cedex; France, vol. SA WG2 , No. Elbonia; Jun. 1, 2020-Jun. 12, 2020, Jun. 2020, XP051889871.

Qualcomm Incorporated :"User Plane BasedUE Data Collection", 3GPP Draft; S2-2000115, 3rd Generation Partnership Project (3GPP) , Mobile Competence Centre ; 650, Route Des Lucioles ; F-06921 Sophia-Antipolis Cedex; France, vol. SA WG2, No. Incheon, KoreaJan. 13, 2020-Jan. 17, 2020,Jan. 7, 2020(Jan. 7, 2020) , XP051842224.

"3rd Generation Partnership Project ;Technical Specification Group Services andSystem Aspects; Study on enablers for network automation for the 5G System(5GS) ; Phase 2 (Release 17)",3GPP Draft; Draft23700-91-040,3rd Generation Partnership Project (3GPP) ,Mobile Competence Centre ; 650, Route Des Lucioles ; F-06921 Sophia-Antipolis Cedex; France, Jun. 11, 2020 (Jun. 11, 2020) , XP051897028.

Grant Notice & Supplementary Search from corresponding Chinese Application No. 202210977385.1, dated Jan. 12, 2024. English translation attached.

Result of consultation issued by the EPO for Application No. 20948953.3 mailed on Sep. 26, 2024.

* cited by examiner

WIRELESS COMMUNICATION METHOD, TERMINAL DEVICE, AND SERVER

CROSS-REFERENCE TO RELATED APPLICATIONS

The present application is a continuation of International Application No. PCT/CN2020/108274 filed on Aug. 10, 2020, which is hereby incorporated by reference in its entirety.

TECHNICAL FIELD

The embodiments of the present disclosure relate to communication technology, and more particularly, to a wireless communication method, a terminal device, and a server.

BACKGROUND

Big data analysis is a trend of future network development. Currently, at least one application data in a terminal device is obtained from various application servers and transmitted to a data usage server for analysis of each application data. However, in the related art, there is necessarily a transmission interface between each application server and the data usage server. That is, each application server transmits corresponding application data through its interface with the data usage server. When any interface fails, the data transmission will fail, thereby reducing the accuracy of data analysis.

SUMMARY

Embodiments of the present disclosure provide a wireless communication method, a terminal device, and a server. Therefore, the accuracy of data analysis can be improved.

In a first aspect, a wireless communication method is provided. The method includes: obtaining, by a terminal device, at least one application data and/or wireless protocol layer data in the terminal device; and transmitting, by the terminal device, the at least one application data and/or wireless protocol layer data of the terminal device to a data collection server.

In a second aspect, a wireless communication method is provided. The method includes: receiving, by a data collection server, at least one application data and/or wireless protocol layer data corresponding to each of at least one terminal device. For one of the at least one terminal device, the at least one application data and/or wireless protocol layer data corresponding to the terminal device is obtained by the terminal device.

In a third aspect, a terminal device is provided. The terminal device is configured to perform the method according to the above first aspect or any implementation thereof.

In particular, the terminal device includes one or more functional modules configured to perform the method according to the above first aspect or any implementation thereof.

In a fourth aspect, a data collection server is provided. The data collection server is configured to perform the method according to the above second aspect or any implementation thereof.

In particular, the data collection server includes one or more functional modules configured to perform the method according to the above second aspect or any implementation thereof.

In a fifth aspect, a terminal device is provided. The terminal device includes a processor and a memory. The memory has a computer program stored thereon, and the processor is configured to invoke and execute the computer program stored in the memory to perform the method according to the above first aspect or any implementation thereof.

In a sixth aspect, a data collection server is provided. The data collection server includes a processor and a memory. The memory has a computer program stored thereon, and the processor is configured to invoke and execute the computer program stored in the memory to perform the method according to the above second aspect or any implementation thereof.

In a seventh aspect, an apparatus is provided. The apparatus is configured to perform the method according to the above first or second aspect or any implementation thereof.

In particular, the apparatus includes a processor configured to invoke and execute a computer program from a memory, to cause a device provided with the apparatus to perform the method according to the above first or second aspect or any implementation thereof.

In an eighth aspect, a computer-readable storage medium is provided. The computer-readable storage medium has a computer program stored thereon. The computer program causes a computer to perform the method according to the above first or second aspect or any implementation thereof.

In a ninth aspect, a computer program product is provided. The computer program product includes computer program instructions that cause a computer to perform the method according to the above first or second aspect or any implementation thereof.

In a tenth aspect, a computer program is provided. The computer program, when executed by a computer, causes the computer to perform the method according to the above first or second aspect or any implementation thereof.

With the technical solution according to the first aspect or the second aspect, the data usage server does not need to obtain the corresponding application data and/or wireless protocol layer data from a plurality of application servers via a plurality of interfaces. Instead, the terminal device can obtain the application data and/or wireless protocol layer data internally, which only needs to be processed by the data collection server and transmitted to the data usage server, thereby reducing the number of interfaces to be used and improving the accuracy of data analysis.

DESCRIPTION OF EMBODIMENTS

The technical solutions in the embodiments of the present disclosure will be described below with reference to the figure in the embodiments of the present disclosure. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

As described above, in the related art, there is a necessity of a transmission interface between each application server and a data usage server. That is, each application server transmits corresponding application data through its interface with the data usage server. When any interface fails, the data transmission will fail, thereby reducing the accuracy of data analysis.

In order to solve this technical problem, in the present disclosure, the terminal device can obtain at least one application data in itself, and transmit it to the data usage server via a data collection server.

Figure 1:
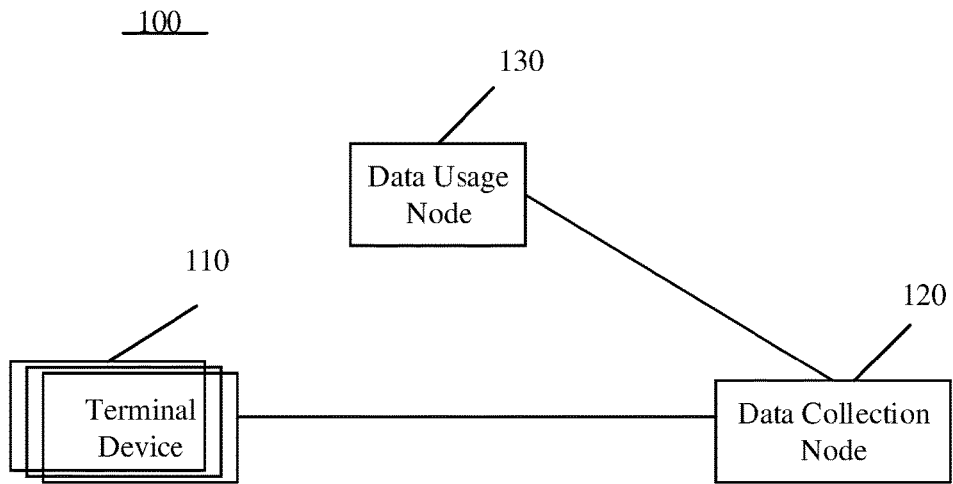
FIG. 1 is a schematic diagram showing a communication system architecture 100 according to an embodiment of the present disclosure.

FIG. 1 is a schematic diagram showing a communication system architecture 100 according to an embodiment of the present disclosure. As shown in FIG. 1, FIG. 1 exemplarily shows a plurality of terminal devices 110, a data collection node 120 and a data usage node 130.

In at least one embodiment, the communication system 100 may also include other network entities such as a network controller, a mobility management entity, and a Network Exposure Function (NEF), and the embodiment of the present disclosure is not limited to this.

It can be appreciated that, in the embodiment of the present disclosure, a device with a communication function in a network/system may be referred to as a communication device. For the communication system 100 shown in FIG. 1 as an example, communication devices may include the terminal devices 110, the data collection node 120, and the data usage node 13. The communication device may also include other devices in the communication system 100, such as a network controller, a mobility management entity, an NEF node, and other network entities, and the embodiment of the present disclosure is not limited to this.

It is to be noted that the terms "system" and "network" are often used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

It is to be noted that in the present disclosure, a node may be a server or a terminal device, and the present disclosure is not limited to any of these examples. The solutions of the present disclosure will be explained with reference to an example where the node is a server.

The embodiments of the present disclosure are described in conjunction with a terminal device, a data collection server, and a data usage server. The terminal device may refer to a User Equipment (UE), an access terminal, a user unit, a user station, a mobile station, a remote station, a remote terminal, a mobile device, a user terminal, a terminal, a wireless communication device, a user agent, or a user device. The terminal device may be a station (ST) in a WLAN, a cellular phone, a cordless phone, a Session Initiation Protocol (SIP) phone, a Wireless Local Loop (WLL) station, a Personal Digital Assistant (PDA) device, a handheld device or a computing device having a wireless communication function, another processing device connected to a wireless modem, a vehicle-mounted device, a wearable device, a terminal device in the next generation communication system (e.g., NR network), or a terminal device in a future evolved Public Land Mobile Network (PLMN), etc.

As non-limiting examples, in an embodiment of the present disclosure, the terminal device may also be a wearable device. The wearable device, also known as wearable smart device, is a general term for wearable devices that are intelligently designed and developed from everyday wear, such as glasses, gloves, watches, clothes, and shoes, by applying wearable technologies. A wearable device is a portable device that can be directly worn on or integrated into a user's clothes or accessories. A wearable device is not only a kind of hardware device, but can also provide powerful functions based on software support, data interaction, and cloud interaction. In a broad sense, wearable smart devices may include full-featured, large-sized devices that can provide full or partial functions without relying on smart phones, such as smart watches or smart glasses, and devices that only focus on a certain type of application function and need to cooperate with other devices such as smart phones for use, such as various smart bracelets and smart jewelries for physical sign monitoring.

In at least one embodiment, the data collection server may be managed and controlled by an operator and belongs to the operator's network. Alternatively, the data collection server may be a server outside the core network, e.g., a server within a mobile network, and the present disclosure is not limited to any of these examples.

In at least one embodiment, the data collection server may be a DCAF server, and the present disclosure is not limited to this.

In at least one embodiment, the data usage server may be a server within a mobile network.

In at least one embodiment, the data usage server may be a Network Data Analysis Function (NWDAF) server.

The technical solutions of the present disclosure are described in detail below with reference to specific embodiments.

Embodiment 1

Figure 2:
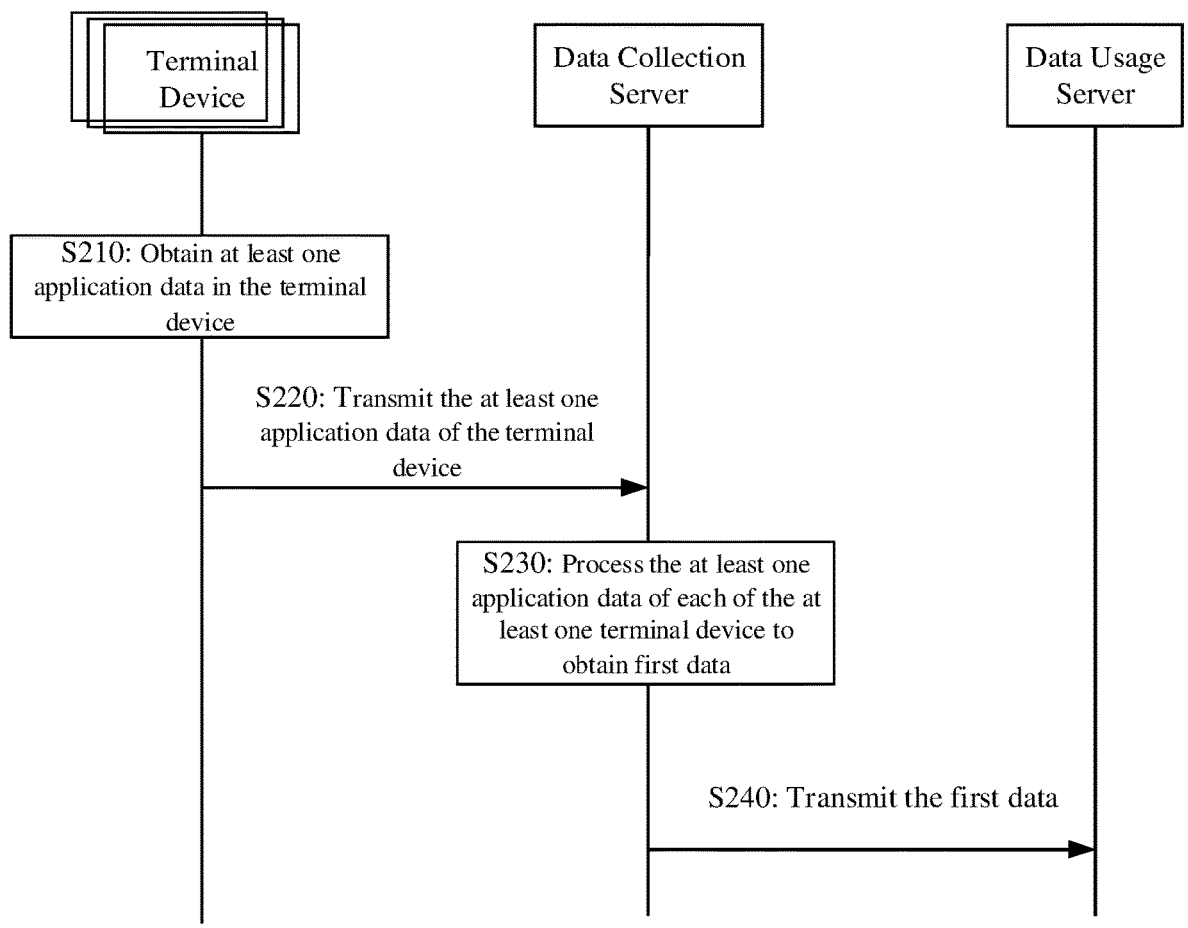
FIG. 2 is a flowchart illustrating interactions in a wireless communication method according to an embodiment of the present disclosure.

FIG. 2 is a flowchart illustrating interactions in a wireless communication method according to an embodiment of the present disclosure. The method includes the following actions at blocks.

At block S210, a terminal device obtains at least one application data in the terminal device.

At block S220, the terminal device transmits the at least one application data of the terminal device to a data collection server.

At block S230, the data collection server processes at least one application data of at least one terminal device to obtain first data.

At block S240, the data collection server transmits the first data to a data usage server.

In at least one embodiment, the terminal device locally obtains the at least one application data in the terminal device.

Figure 3:
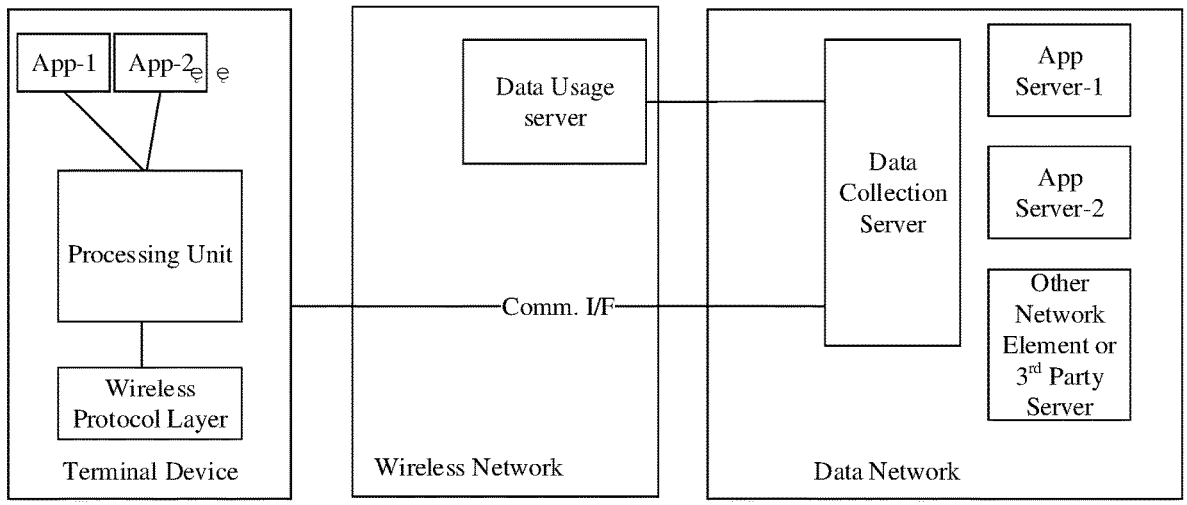
FIG. 3 is a schematic diagram showing an internal implementation of a communication system according to an embodiment of the present disclosure.

FIG. 3 is a schematic diagram showing an internal implementation of a communication system according to an embodiment of the present disclosure. As shown in FIG. 3, there is a processing unit and various applications inside the terminal device, and an Application Programming Interface (API) is provided between the processing unit and each application. The corresponding application data can be obtained through the application program interface. After obtaining each application data, the data collection server can process each application data, and transmit the processed data to the data usage server.

In at least one embodiment, an application layer protocol (such as HTTP protocol) may be used for connection establishment and data transmission between the terminal and the data collection server.

In at least one embodiment, an NEF server may be provided between the data collection server and the data usage server, and the NEF server may be configured to implement data transmission between the data collection server and the data usage server.

It can be appreciated that the processing unit in the present disclosure may be described as a data collection module or a data collection unit, etc., and the present disclosure is not limited to any of these examples.

In at least one embodiment, the terminal device may also transmit data of a wireless protocol layer to the data collection server.

In at least one embodiment, the wireless protocol layer may be a $3^{rd}$ Generation Partnership Project (3GPP) protocol layer. The 3GPP protocol layer may include Non-Access Stratum (NAS) layer and Access Stratum (AS) layer data. For example, the terminal device transmits, to the data collection server, data such as usage of a terminal device policy, usage of a PDU session, and a movement trajectory based on cell IDs or Tracking Area Identities (TAIs).

In at least one embodiment, in the present disclosure, the application data may be application layer data and/or data provided by an operating system. The application layer data may be data of one or more applications (Apps), which may be provided by the application itself/applications themselves or provided by another module (such as an operating system).

In at least one embodiment, for one of the at least one application, the application data may include at least one of: an identifier of the application, usage time of the application, and information on a usage location of the application.

In at least one embodiment, the at least one application data of the terminal device may be carried in any of: a new field of a data packet, an existing field of the data packet, and indication information transmitted by the terminal device to the data collection server.

In at least one embodiment, the above data packet may be a data packet of any protocol layer, for example, an application layer data packet or a data packet of a 3GPP protocol layer.

In at least one embodiment, as shown in FIG. 3, the communication connection may further include: a signaling plane and a user plane. As a possibility, the signaling plane can be used to exchange control messages. For example, the data collection server can transmit a data request message to the terminal via the signaling plane. In addition, the signaling plane can also be used to exchange information corresponding to application data. For example, the terminal device can transmit, to the data collection server via the signaling plane, an identifier of the application corresponding to the application data of at least one application in the terminal device, usage time of the application, or information on a usage location of the application, etc. The user plane may be used to transmit the specific content of the application data and/or wireless protocol layer data.

In at least one embodiment, before the action at block S220, the data collection server may transmit a request message to the terminal device, for requesting the terminal device to transmit the at least one application data and/or wireless protocol layer data.

In at least one embodiment, the terminal device may receive the request message via a first API. The first API may be an API on a processing unit in the terminal device, which is configured to receive the request message.

In at least one embodiment, the data collection server may combine or gather statistics on the at least one application data of the at least one terminal device to obtain the first data.

In at least one embodiment, the data usage server may transmit a request message to the data collection server for requesting the data collection server to transmit the first data.

To summarize, in the present disclosure, for any terminal device, the terminal device can obtain at least one application data in the terminal device, and transmit the at least one application data of the terminal device to a data collection server, such that the data collection server can process the at least one application data of the terminal device to obtain first data, and transmit the first data to a data usage server. It can be seen that, in the present disclosure, the data usage server does not need to obtain the corresponding application data from a plurality of application servers via a plurality of interfaces. Instead, the terminal device can obtain the application data internally, which only needs to be processed by the data collection server and transmitted to the data usage server, thereby reducing the number of interfaces to be used and improving the accuracy of data analysis.

Embodiment 2

As described above, the data collection server may combine or gather statistics on the at least one application data of the at least one terminal device, which is exemplified below.

Example 1: For any application, the data collection server determines usage time distribution of the application and/or peak time in the usage time distribution of the application based on usage time of the application corresponding to each of the at least one terminal device.

In this case, each terminal device needs to transmit the identifier and the usage time of the application to the data collection server. For example, Terminal Device 1 transmits the identifier and the usage time of Application A and the identifier and the usage time of Application B to the data collection server. Terminal Device 2 transmits the identifier and the usage time of Application A and the identifier and the usage time of Application B to the data collection server. Terminal Device 3 transmits the identifier and the usage time of Application A and the identifier and the usage time of Application B to the data collection server. As such, the data collection server can determine the usage time distribution of Application A and/or the peak time in the usage time distribution of Application A, such as high-peak usage time or low-peak usage time, according to the usage time of Application A transmitted by Terminal Devices 1, 2, and 3, respectively. Similarly, the data collection server can also determine the usage time distribution of Application B and/or the peak time in the usage time distribution of Application B, such as high-peak usage time or low-peak usage time, according to the usage time of Application B transmitted by Terminal Devices 1, 2, and, 3 respectively.

Example 2: For any time period, the data collection server determines an application with a highest usage frequency or an application with a lowest usage frequency in the time period based on usage time of the at least one application corresponding to each of the at least one terminal device.

In this case, each terminal device needs to transmit the identifier and the usage time of the application to the data collection server. For example, Terminal Device 1 transmits the identifier and the usage time of Application A and the identifier and the usage time of Application B to the data collection server. Terminal Device 2 transmits the identifier and the usage time of Application A and the identifier and the usage time of Application B to the data collection server. Terminal Device 3 transmits the identifier and the usage time of Application A and the identifier and the usage time of Application B to the data collection server. As such, the data collection server can determine the application with the highest usage frequency or the application with the lowest usage frequency within the time period [t1, t2], e.g., Application A, and the application with the highest usage frequency or the application with the lowest usage frequency within the time period [t3, t4], e.g., Application B. In this way, the data collection server can obtain the difference between different applications in different time periods.

In at least one embodiment, the terminal device may also determine a usage ratio of the application with the highest or the lowest usage frequency in the time period. For example: in the time period [t1, t2], Application A with the highest frequency occupies a ratio of 65%. In the time period [t3, t4], Application B with the highest frequency occupies a ratio of 70%.

Example 3: For any application, the data collection server determines a distribution of the information on the usage location of the application and/or a peak location in the distribution of the information on the usage location of the application based on the information on the usage location of the application corresponding to each of the at least one terminal device.

In this case, each terminal device needs to transmit the identifier and the information on the usage location of the application to the data collection server. For example, Terminal Device 1 transmits the identifier and the information on the usage location of Application A, and the identifier and the information on the usage location of Application B, to the data collection server. Terminal Device 2 transmits the identifier and the information on the usage location of Application A, and the identifier and the information on the usage location Application B, to the data collection server. Terminal Device 3 transmits the identifier and the information on the usage location of Application A, and the identifier and the information of the usage location of Application B, to the data collection server. As such, the data collection server can determine the distribution of the information on the usage location of Application A and/or the peak in the distribution of the information on the usage location of Application A, e.g., information on high-peak usage location or information on low-peak usage location, according to the information on the usage location of Application A transmitted by Terminal Device 1, 2, and 3, respectively. Similarly, the data collection server can also determine the distribution of the information on the usage location of Application B and/or the peak in the distribution of the information on the usage location of Application B, e.g., information on high-peak usage location or information on low-peak usage location, according to the information on the usage location of Application B transmitted by Terminal Devices 1, 2 and, 3 respectively.

Example 4: For any location, the data collection server determines an application with a highest usage frequency or an application with a lowest usage frequency at the location based on information on a usage location of the at least one application corresponding to each of the at least one terminal device.

In at least one embodiment, the information on the usage location in the present disclosure may be any of: Global Positioning System (GPS) coordinates, a location identifier.

In at least one embodiment, the location identifier may be a cell ID or a TAI.

In this case, each terminal device needs to transmit the identifier and the information on the usage location of the application to the data collection server. For example, the data collection server may determine according to the application identifier and the information on the usage location that on a commercial street in a city, the application has the highest usage by users is Application A, and in an office building, the application has the highest usage is Application B.

Example 5: For any application, the data collection server combines usage time of the application by the at least one terminal device, and/or information on a usage location of the application by the at least one terminal device.

In at least one embodiment, before combining the usage time of the application by the at least one device, and/or before combining the information on the usage location of the application by the at least one device, the data collection server may scramble the usage time of the application and/or scramble the information on the usage location of the application.

In at least one embodiment, the data collection server may use a white noise method to scramble the usage time of the application and/or the information on the usage location of the application, and the present disclosure is not limited to any specific scrambling method.

In at least one embodiment, the data collection server may combine the usage time of the application and/or the information on the usage location of the application by calculating an average value of the usage time of the application by the at least one terminal device and/or an average value of the information on the usage location of the application by the at least one terminal device.

In at least one embodiment, the data collection server may use arithmetic average, geometric average, square average, harmonic average, weighted average, etc., to calculate the average value of the usage time of the application and/or the information on the usage location of the application.

It is to be noted that although the application data of each terminal device is inaccurate after scrambling, after the data from a number of terminal devices is combined, the general trend of the data is the same or substantially the same as that obtained by combination before scrambling. In this way, the data transmitted to the data collection server does not reveal the user's private data, while ensuring that the general trend of the processed data is consistent with that of the original data.

To summarize, in the present disclosure, the data collection server can combine or gather statistics on the at least one application data of the at least one terminal device, such that the user's private data can be eliminated, thereby improving network security.

Embodiment 3

Figure 4:
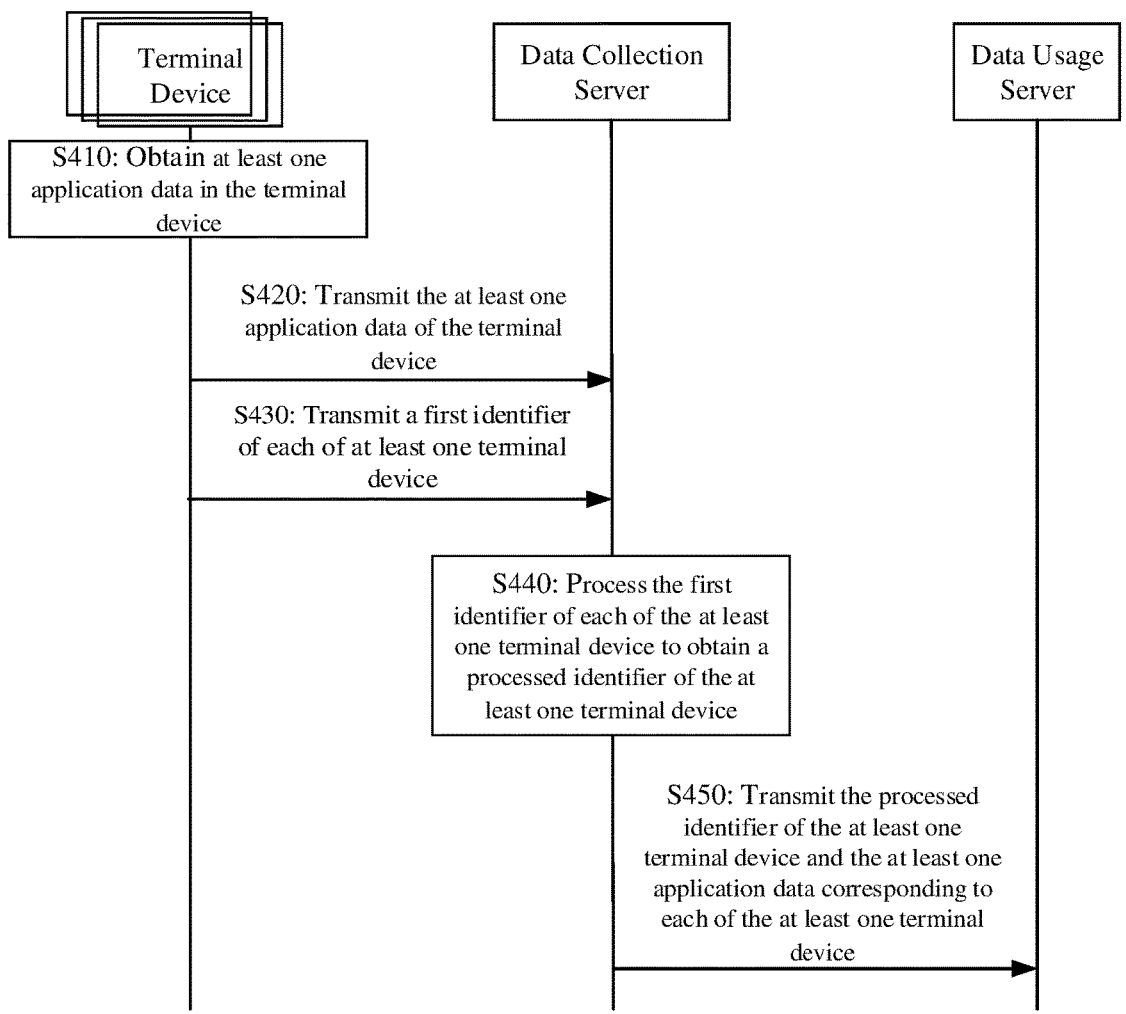
FIG. 4 is a flowchart illustrating interactions in a wireless communication method according to another embodiment of the present disclosure.

FIG. 4 is a flowchart showing interactions in a wireless communication method according to another embodiment of the present disclosure. The method includes the following actions at blocks.

At block S410, a terminal device obtains at least one application data in the terminal device.

At block S420, the terminal device transmits the at least one application data of the terminal device to a data collection server.

At block S430, the terminal device transmits a first identifier of each of the at least one terminal device to the data collection server.

At block S440, the data collection server processes the first identifier of each of the at least one terminal device to obtain a processed identifier of the at least one terminal device.

At block S450, the data collection server transmits the processed identifier of the at least one terminal device and the at least one application data corresponding to each of the at least one terminal device to a data usage server.

It can be appreciated that the action at block S410 is the same as the action at block S210, and the action at block S420 is the same as the action at block S220. Therefore, for description of the action at block S410 and the action at block S420, reference can be made to the description of the action at block S210 and the action at block S220, and details thereof will be omitted here.

Action at blocks S430 to S450 will be described below.

In at least one embodiment, each terminal device above may transmit the corresponding at least one application data and the first identifier together in a package to the data collection server. Alternatively, each terminal device above may transmit the corresponding at least one application data and the first identifier separately to the data collection server. The present disclosure is not limited to any of these examples.

In at least one embodiment, the data collection server may process the first identifier of each of the at least one terminal device in any of the following schemes, as non-limiting examples:

Optional Scheme 1: The data collection server may update the first identifier of each of the at least one terminal device to a group identifier. The group identifier is the processed identifier of the at least one terminal device.

Optional Scheme 2: The data collection server may update the first identifier of each of the at least one terminal device to a second identifier of each of the at least one terminal device. The second identifier of each of the at least one terminal device is the processed identifier of the at least one terminal device.

The Optional Scheme 1 will be described below.

The group identifier refers to a common identifier of the above at least one terminal device.

In at least one embodiment, the data collection server may generate a correspondence between the first identifier of each of the at least one terminal device and the group identifier, and store the correspondence between the first identifier of each of the at least one terminal device and the group identifier locally or in the cloud. Accordingly, the data collection server may map the first identifier of each of the at least one terminal device to the group identifier according to the correspondence.

In at least one embodiment, the data collection server may transmit a number of terminal devices identified by the group identifier among the at least one terminal device to the data usage server.

In at least one embodiment, the data collection server may transmit the group identifier of the at least one terminal device and the at least one application data corresponding to each of the at least one terminal device together in a package to the data usage server. Alternatively, the data collection server may transmit the group identifier of the at least one terminal device and the at least one application data corresponding to the at least one terminal device separately to the data usage server.

The Optional Scheme 2 will be described below.

In at least one embodiment, the second identifier of each of the at least one terminal device may correspond to the first identifier of each of the at least one terminal device, respectively.

In at least one embodiment, the correspondence between the first identifier and the second identifier of each of the at least one terminal device is a one-to-one correspondence.

Exemplarily, it is assumed that the first identifiers of at least one terminal Terminal Device 1, 2, and 30 are UE-1, UE-2, and UE-3, respectively, and their respective second identifiers are UE-1*, UE-2*, and UE-3*.

In at least one embodiment, the data collection server may generate a correspondence between the first identifier and the second identifier of each of the at least one terminal device, and store the correspondence between the first identifier and the second identifier of each of the at least one terminal device locally or in the cloud. Accordingly, the data collection server may map the first identifier of each of at least one terminal device to the second identifier according to the correspondence.

In at least one embodiment, the data collection server may transmit the second identifier of each of the at least one terminal device and the at least one application data corresponding to each of the at least one terminal device together in a package to the data usage server. Alternatively, the data collection server may transmit the second identifier of each of the at least one terminal device and the at least one application data corresponding to each of the at least one terminal device separately to the data usage server.

To summarize, in the present disclosure, the data collection server can map the received first identifier of each of the at least one terminal device to a group identifier or a second identifier of each of the at least one terminal device, hiding the first identifier of each of the at least one terminal device, i.e. private data. Therefore, even if the data usage server obtains each application data of the at least one terminal device, it cannot know which terminal device the data belongs to, thereby improving network security.

Embodiment 4

Figure 5:
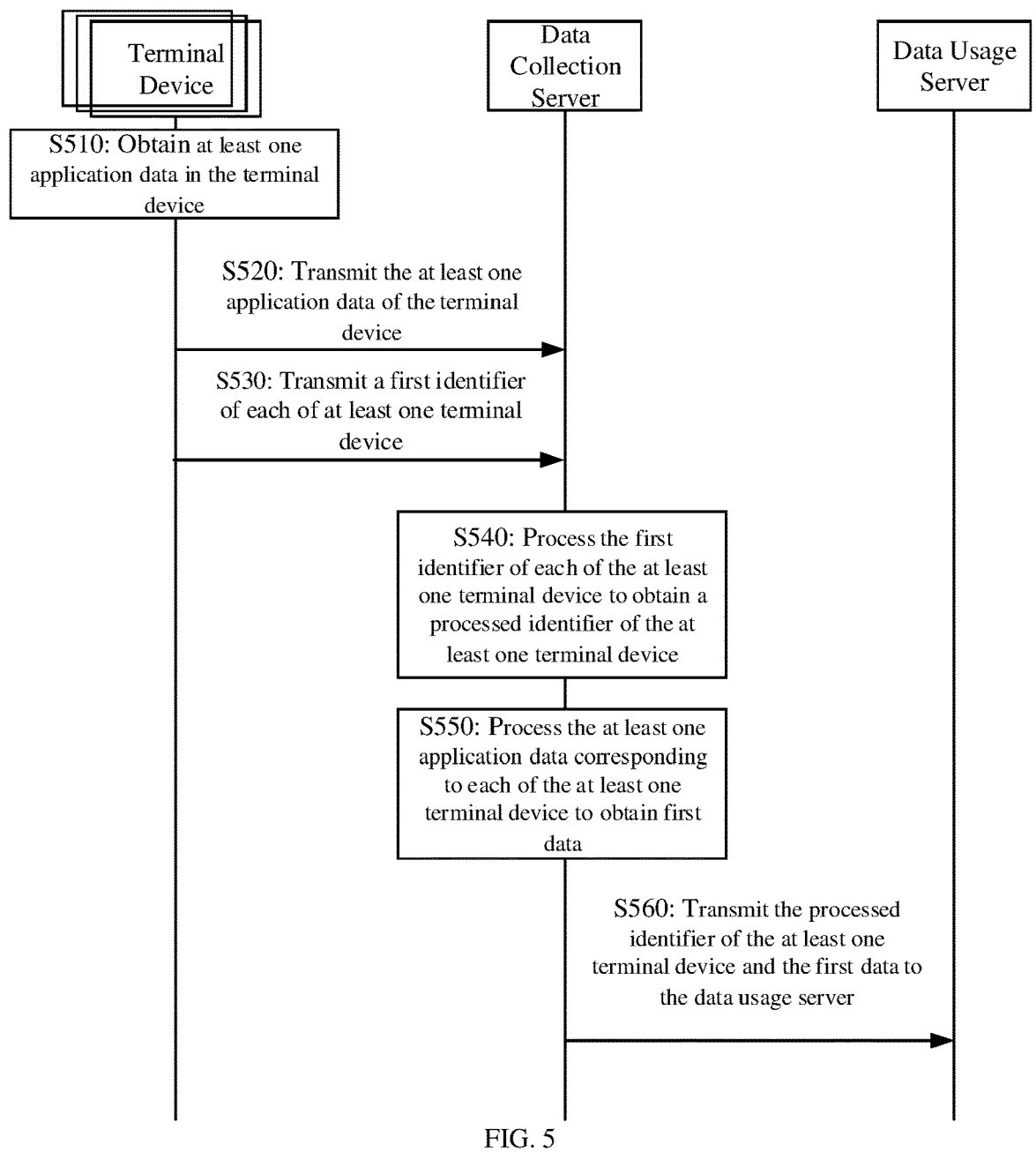
FIG. 5 is a flowchart illustrating interactions in a wireless communication method according to yet another embodiment of the present disclosure.

FIG. 5 is a flowchart illustrating interactions in a wireless communication method according to yet another embodiment of the present disclosure. The method includes the following actions at blocks.

At block S510, a terminal device obtains at least one application data in the terminal device.

At block S520, the terminal device transmits the at least one application data of the terminal device to a data collection server.

At block S530, the terminal device transmits a first identifier of each of the at least one terminal device to the data collection server.

At block S540, the data collection server processes the first identifier of each of the at least one terminal device to obtain a processed identifier of the at least one terminal device.

At block S550, the data collection server processes the at least one application data corresponding to the at least one terminal device to obtain first data.

At block S560, the data collection server transmits the processed identifier of the at least one terminal device and the first data to a data usage server.

It can be appreciated that the action at block S510 is the same as the action at block S210, and the action at block S520 is the same as the action at block S220. Therefore, for description of the action at block S510 and the action at block S520, reference can be made to the description of the action at block S210 and the action at block S220, and details thereof will be omitted here.

The action at block S530 is the same as the action at block S430, and the action at block S540 is the same as the action at block S440. Therefore, for description of the action at block S530 and the action at block S540, reference can be made to the description of the action at block S430 and the action at block S440, and details thereof will be omitted here.

For description of the block S550, reference may be made to the content of Embodiment 2, and details thereof will be omitted here.

The block S560 will be described below.

In at least one embodiment, the data collection server may transmit the processed identifier of the at least one terminal device and the first data together in a package or separately to the data usage server, and the present disclosure is not limited to any of these examples.

To summarize, in the present disclosure, the data collection server can map the received first identifier of each of the at least one terminal device to a group identifier or a second identification of each of the at least one terminal device, hiding the first identifier of each of the at least one terminal device, i.e. private data. Therefore, even if the data usage server obtains each application data of the at least one terminal device, it cannot know which terminal device the data belongs to, thereby improving network security. In addition, the data collection server can combine or gather statistics on at least one application data of the at least one terminal device, such that the user's private data can be eliminated, and the network security can also be improved.

Embodiment 5

As described above, the data collection server can process, such as combining or gathering statistics on, the at least one application data corresponding to each of the at least one terminal device, referring to the examples in Embodiment 2, or can process the at least one application data corresponding to each of the at least one terminal device and the first identifier of each of the at least one terminal device, referring to the contents of Embodiment 3 and Embodiment 4. In practical applications, the data collection server may select any of these processing schemes for data processing. Therefore, the data collection server may determine a first parameter, and the first parameter indicates to the data collection server a scheme for the data collection server to process the at least one application data corresponding to each of the at least one terminal device, or the first parameter indicates to the data collection server a scheme for the data collection server to proves the at least one application data corresponding to each of the at least one terminal device and the first identifier of each of the at least one terminal device.

In at least one embodiment, the data collection server may exchange the above first parameter with the terminal device or the data usage server to indicate to the data collection server a scheme for the data collection server to process the at least one application data corresponding to each of the at least one terminal device, or to indicate to the data collection server a scheme for the data collection server to process the at least one application data corresponding to each of the at least one terminal device and the first identifier of each of the at least one terminal device.

Exemplarily, it is assumed that the processing scheme corresponding to Example 1 in Embodiment 2 is referred to as Application-based Processing Scheme 1, the processing scheme corresponding to Example 2 in Embodiment 2 is referred to as Time-based Processing Scheme, the processing scheme corresponding to Example 3 in Embodiment 2 is referred to as Application-based Processing Scheme 2, the processing scheme corresponding to Example 4 in Embodiment 2 is referred to as Location-based Processing Scheme, the processing scheme corresponding to Example 5 in Embodiment 2 is called Scrambled Statistics-based Processing Scheme, and the processing scheme about group identifier in Embodiment 3 or Embodiment 4 is referred to as Group Statistics-based Processing Scheme. Then they correspond to unique first parameters, as shown in Table 1:

TABLE 1

| First Parameter | Processing Scheme |
| --- | --- |
| 1 | Application-based Processing Scheme 1 |
| 2 | Time-based Processing Scheme |
| 3 | Application-based Processing Scheme 2 |
| 4 | Location-based Processing Scheme |
| 5 | Scrambled Statistics-based Processing Scheme |
| 6 | Group Statistics-based Processing Scheme |

To summarize, in the present disclosure, the data collection server may determine a first parameter, and the first parameter indicate to the data collection server a scheme for the data collection server to process the at least one application data corresponding to each of the at least one terminal device, or the first parameter indicate to the data collection server a scheme for the data collection server to process the at least one application data corresponding to each of the at least one terminal device and the first identifier of each of the at least one terminal device. Further, the data collection server can exchange the first parameter with the terminal device or the data usage server, such that the terminal device or the data usage server can get the data processing method used by the data collection server.

The method embodiments of the present disclosure have been described in detail above with reference to FIGS. 2 to 5, and the apparatus embodiments of the present disclosure will be described in detail below with reference to FIGS. 6 to 9. It can be appreciated that the apparatus embodiments and the method embodiments correspond to each other, and for the description of the apparatus embodiments, reference can be made to the method embodiments.

Embodiment 6

Figure 6:
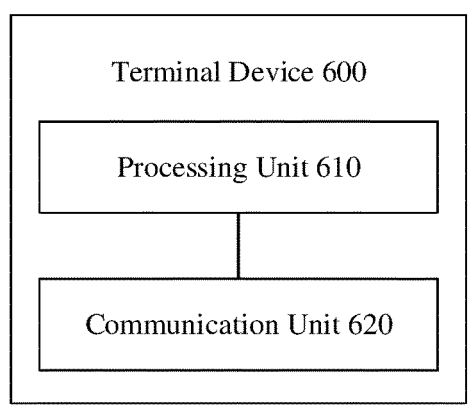
FIG. 6 shows a schematic block diagram of a terminal device 600 according to an embodiment of the present disclosure.

FIG. 6 shows a schematic block diagram of a terminal device 600 according to an embodiment of the present disclosure. As shown in FIG. 6, the terminal device 600 includes:

a processing unit 610 configured to obtain at least one application data and/or wireless protocol layer data in the terminal device; and a communication unit 620 configured to transmit the at least one application data and/or wireless protocol layer data of the terminal device to a data collection server.

In at least one embodiment, the communication unit 620 may be further configured to receive a request message for requesting the terminal device to transmit the at least one application data and/or wireless protocol layer data.

In at least one embodiment, the communication unit 620 may be configured to receive the request message via a first Application Program Interface (API).

In at least one embodiment, the at least one application data and/or wireless protocol layer data of the terminal device may be carried in any of: a new field of a data packet, an existing field of the data packet, and indication information transmitted by the terminal device to the data collection server.

In at least one embodiment, the communication unit 620 may be configured to transmit, for one of at least one application, at least one of the following to the data collection server: an identifier of the application, usage time of the application, and information on a usage location of the application.

In at least one embodiment, the data collection server may be managed and controlled by an operator and belong to the operator's network.

In some embodiments, the above communication unit may be a communication interface or a transceiver, or an input/output interface of a communication chip or a system-on-chip. The above processing unit may be one or more processors.

It can be appreciated that the terminal device 600 according to the embodiment of the present disclosure may correspond to the terminal device in any of the method embodiments of the present disclosure, and the above and other operations and/or functions of the respective units in the terminal device 600 are provided to implement the corresponding process of the terminal device in any of the above method embodiments. For the sake of brevity, details thereof will be omitted here.

Embodiment 7

Figure 7:
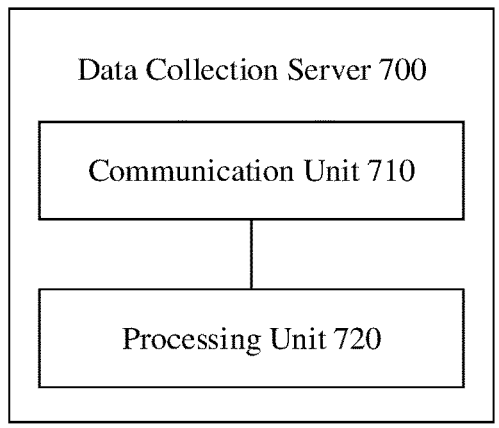
FIG. 7 shows a schematic block diagram of a data collection server 700 according to an embodiment of the present disclosure.

FIG. 7 shows a schematic block diagram of a data collection server 700 according to an embodiment of the present disclosure. As shown in FIG. 7, the data collection server 700 includes: a communication unit 710 configured to receive at least one application data and/or wireless protocol layer data corresponding to each of at least one terminal device. For one of the at least one terminal device, the at least one application data and/or wireless protocol layer data corresponding to the terminal device is obtained by the terminal device.

In at least one embodiment, the communication unit 710 may be further configured to transmit a request message to the terminal device, for requesting the terminal device to transmit the at least one application data and/or wireless protocol layer data.

In at least one embodiment, for any of the at least one terminal device, the at least one application data and/or wireless protocol layer data of the terminal device may be carried in any of: a new field of a data packet, an existing field of the data packet, and indication information transmitted by the terminal device to the data collection server.

In at least one embodiment, the communication unit 710 may be configured to receive, for any of at least one application, at least one of the following transmitted by the terminal: an identifier of the application, usage time of the application, and information on a usage location of the application.

In at least one embodiment, the data collection server 700 may further include a processing unit 720. The processing unit 720 is configured to process the at least one application data corresponding to each of the at least one terminal device to obtain first data. The communication unit 710 may be further configured to transmit the first data to a data usage server.

In at least one embodiment, the processing unit 720 may be configured to gather statistics on, or combine, the at least one application data corresponding to each of the at least one terminal device to obtain the first data.

In at least one embodiment, the processing unit 720 may be configured to determine, for any application, usage time distribution of the application and/or peak time therein based on usage time of the application corresponding to each of the at least one terminal device.

In at least one embodiment, the processing unit 720 may be configured to determine, for any time period, an application with a highest or lowest usage frequency in the time period based on usage time of the at least one application corresponding to each of the at least one terminal device.

In at least one embodiment, the processing unit 720 may be configured to determine, for any application, a distribution of information on a usage location of the application and/or a peak location therein based on information on usage location of the application corresponding to each of the at least one terminal device.

In at least one embodiment, the processing unit 720 may be configured to determine, for any location, an application with a highest or lowest usage frequency at the location based on information on a usage location of the at least one application corresponding to each of the at least one terminal device.

In at least one embodiment, the processing unit 720 may be configured to combine, for any application, usage time of the application by the at least one terminal device, and/or information on a usage location of the application by the at least one terminal device.

In at least one embodiment, the processing unit 720 may be configured to scramble the usage time of the application and/or the information on the usage location of the application.

In at least one embodiment, the processing unit 720 may be configured to calculate an average value of the usage time of the application by the at least one terminal device and/or an average value of the information on the usage location of the application by the at least one terminal device.

In at least one embodiment, the data collection server 700 may further include: a processing unit 720 configured to obtain a first identifier of each of the at least one terminal device; and process the first identifier of each of the at least one terminal device to obtain a processed identifier of the at least one terminal device.

In at least one embodiment, the communication unit 710 may be further configured to transmit the processed identifier of the at least one terminal device and the at least one application data corresponding to each of the at least one terminal device to the data usage server.

In at least one embodiment, the processing unit 720 may be further configured to process the at least one application data corresponding to each of the at least one terminal device to obtain first data. The communication unit 710 may be further configured to transmit the processed identifier of the at least one terminal device and the first data to the data usage server.

In at least one embodiment, the processing unit 720 may be configured to update the first identifier of each of the at least one terminal device to a group identifier. The group identifier is the processed identifier of the at least one terminal device.

In at least one embodiment, the communication unit 710 may be further configured to transmit a number of terminal devices identified by the group identifier among the at least one terminal device to the data usage server.

In at least one embodiment, the group identifier may correspond to the first identifier of each of the at least one terminal device.

In at least one embodiment, the processing unit 720 may be configured to update the first identifier of each of the at least one terminal device to a second identifier of each of the at least one terminal device. The second identifier of each of the at least one terminal device is the processed identifier of the at least one terminal device.

In at least one embodiment, the second identifier of each of the at least one terminal device corresponds to the first identifier of each of the at least one terminal device, respectively.

In at least one embodiment, the communication unit 710 may be configured to receive the at least one application data corresponding to each of the at least one terminal device via a user plane.

In at least one embodiment, the data collection server 700 may further include: a processing unit configured to determine a first parameter. The first parameter indicates to the data collection server a scheme for the data collection server to process the at least one application data corresponding to each of the at least one terminal device, or the at least one application data corresponding to each of the at least one terminal device and the first identifier of each of the at least one terminal device.

In at least one embodiment, the data collection server may be managed and controlled by an operator and belong to the operator's network.

In some embodiments, the above communication unit may be a communication interface or a transceiver, or an input/output interface of a communication chip or a system-on-chip. The above processing unit may be one or more processors.

It can be appreciated that the data collection server 700 according to the embodiment of the present disclosure may correspond to the network device in any of the method embodiments of the present disclosure, and the above and other operations and/or functions of the respective units in the data collection server 700 are provided to implement the corresponding process of the network device in any of the above method embodiments. For the sake of brevity, details thereof will be omitted here.

Embodiment 8

Figure 8:
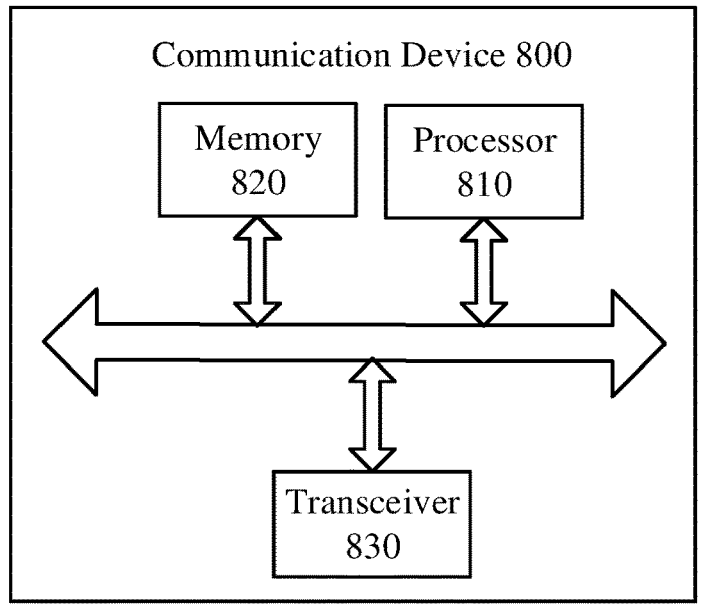
FIG. 8 is a schematic diagram showing a structure of a communication device 800 according to an embodiment of the present disclosure.

FIG. 8 is a schematic diagram showing a structure of a communication device 800 according to an embodiment of the present disclosure. The communication device 800 shown in FIG. 8 includes a processor 810, and the processor 810 can invoke and execute a computer program from a memory to implement the method in the embodiment of the present disclosure.

In at least one embodiment, as shown in FIG. 8, the communication device 800 may further include a memory 820. The processor 810 can invoke and execute a computer program from the memory 820 to implement the method in the embodiment of the present disclosure.

The memory 820 may be a separate device independent from the processor 810, or may be integrated in the processor 810.

In at least one embodiment, as shown in FIG. 8, the communication device 800 may further include a transceiver 830, and the processor 810 may control the transceiver 830 to communicate with other devices, and in particular, transmit information or data to other devices, or receive information or data transmitted by other devices.

Here, the transceiver 830 may include a transmitter and a receiver. The transceiver 830 may further include one or more antennas.

In at least one embodiment, the communication device 800 may specifically be the data collection server according to the embodiment of the present disclosure, and the communication device 800 may implement the corresponding processes implemented by the data collection server in any of the methods according to the embodiments of the present disclosure. For the sake of brevity, details thereof will be omitted here.

In at least one embodiment, the communication device 800 may specifically be the terminal device according to the embodiment of the present disclosure, and the communication device 800 may implement the corresponding processes implemented by the terminal device in any of the methods according to the embodiments of the present disclosure. For the sake of brevity, details thereof will be omitted here.

Embodiment 9

Figure 9:
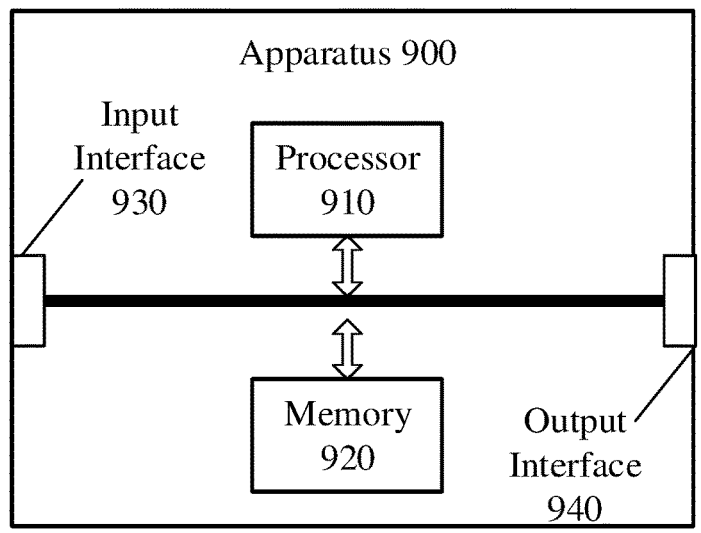
FIG. 9 is a schematic diagram showing a structure of an apparatus according to an embodiment of the present disclosure.

FIG. 9 is a schematic diagram showing a structure of an apparatus according to an embodiment of the present disclosure. The apparatus 900 shown in FIG. 9 includes a processor 910, and the processor 910 can invoke and execute a computer program from a memory to implement the method in the embodiment of the present disclosure.

In at least one embodiment, as shown in FIG. 9, the apparatus 900 may further include a memory 920. The processor 910 can invoke and execute a computer program from the memory 920 to implement the method in the embodiment of the present disclosure.

The memory 920 may be a separate device independent from the processor 910, or may be integrated in the processor 910.

In at least one embodiment, the apparatus 900 may further include an input interface 930. The processor 910 can control the input interface 930 to communicate with other devices or chips, and in particular, obtain information or data transmitted by other devices or chips.

In at least one embodiment, the apparatus 900 may further include an output interface 940. The processor 910 can control the output interface 940 to communicate with other devices or chips, and in particular, output information or data to other devices or chips.

In at least one embodiment, the apparatus can be applied to the data collection server in the embodiment of the present disclosure, and the apparatus can implement the corresponding processes implemented by the data collection server in the various methods of the embodiments of the present disclosure. For the sake of brevity, details thereof will be omitted here.

In at least one embodiment, the apparatus can be applied to the terminal device in the embodiment of the present disclosure, and the apparatus can implement the corresponding process implemented by the terminal device in each method of the embodiment of the present disclosure. For the sake of brevity, details thereof will be omitted here.

In at least one embodiment, the apparatus in the embodiment of the present disclosure may be a chip, and the chip may also be referred to as a system-level chip, a system-chip, a chip system, or a system-on-chip.

A communication system is further provided according to an embodiment of the present disclosure. As shown in FIG. 1, the communication system includes a terminal device, a data collection server and a data usage server.

Here, the terminal device can be configured to implement the corresponding functions implemented by the terminal device in the above method, and the data collection server can be configured to implement the corresponding functions implemented by the data collection server in the above method. For the sake of brevity, details thereof will be omitted here.

It is to be noted that the processor in the embodiment of the present disclosure may be an integrated circuit chip with signal processing capability. In an implementation, the actions of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, actions, and logical block diagrams disclosed in the embodiments of the present disclosure can be implemented or performed. The general purpose processor may be a microprocessor or any conventional processor. The actions of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the actions s of the above methods in combination with its hardware.

It can be appreciated that the memory in the embodiments of the present disclosure may be a volatile memory or a non-volatile memory, or may include both volatile and non-volatile memories. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As illustrative, rather than limiting, examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer readable storage medium having a computer program stored thereon.

In at least one embodiment, the computer readable storage medium can be applied in the data collection server in the embodiment of the present disclosure, and the computer program can cause a computer to perform corresponding procedures implemented by the data collection server in the method according to any of the embodiments of the present disclosure. Details thereof will be omitted here for simplicity.

In at least one embodiment, the computer readable storage medium can be applied in the mobile terminal/terminal device in the embodiment of the present disclosure, and the computer program can cause a computer to perform corresponding procedures implemented by the mobile terminal/terminal device in the method according to any of the embodiments of the present disclosure. Details thereof will be omitted here for simplicity.

An embodiment of the present disclosure also provides a computer program product including computer program instructions.

In at least one embodiment, the computer program product can be applied in the data collection server in the embodiment of the present disclosure, and the computer program instructions can cause a computer to perform corresponding procedures implemented by the data collection server in the method according to any of the embodiments of the present disclosure. Details thereof will be omitted here for simplicity.

In at least one embodiment, the computer program product can be applied in the mobile terminal/terminal device in the embodiment of the present disclosure, and the computer program instructions can cause a computer to perform corresponding procedures implemented by the mobile terminal/terminal device in the method according to any of the embodiments of the present disclosure. Details thereof will be omitted here for simplicity.

An embodiment of the present disclosure also provides a computer program.

In at least one embodiment, the computer program can be applied in the data collection server in the embodiment of the present disclosure. The computer program, when executed by a computer, can cause the computer to perform corresponding procedures implemented by the data collection server in the method according to any of the embodiments of the present disclosure. Details thereof will be omitted here for simplicity.

In at least one embodiment, the computer program can be applied in the mobile terminal/terminal device in the embodiment of the present disclosure. The computer program, when executed by a computer, can cause the computer to perform corresponding procedures implemented by the mobile terminal/terminal device in the method according to any of the embodiments of the present disclosure. Details thereof will be omitted here for simplicity.

It can be appreciated by those skilled in the art that units and algorithm actions in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer readable storage medium. Based on this understanding, all or part of the technical solutions according to the embodiments of the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the actions of the method described in each of the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

While the specific embodiments of the present disclosure have been described above, the scope of the present disclosure is not limited to these embodiments. Various variants and alternatives can be made by those skilled in the art without departing from the scope of the present disclosure. These variants and alternatives are to be encompassed by the scope of present disclosure as defined by the claims as attached.

What is claimed is:

1. A wireless communication method, comprising:
   receiving, by a data collection server, at least one application data corresponding to each of at least one terminal device,
   wherein, the at least one application data corresponding to the at least one terminal device is obtained by the at least one terminal device,
   determining, by the data collection server, a first parameter, wherein the first parameter indicates a scheme for the data collection server to process the at least one application data corresponding to each of the at least one terminal device, or indicates a scheme for the data collection server to process the at least one application data corresponding to each of the at least one terminal device and a first identifier of each of the at least one terminal device,
   wherein the first parameter is exchanged by the data collection server with a data usage server, such that the data usage server gets a data processing method used by the data collection server,
   wherein the data usage server is a Network Data Analysis Function (NWDAF) server,
   processing, by the data collection server, the at least one application data corresponding to each of the at least one terminal device to obtain first data; and
   transmitting, by the data collection server, the first data to the data usage server,
   processing, by the data collection server, the first identifier of each of the at least one terminal device to obtain a processed identifier of the at least one terminal device, wherein said processing comprises:
   updating, by the data collection server, the first identifier of each of the at least one terminal device to a second identifier of each of the at least one terminal device,
   wherein the second identifier of each of the at least one terminal device is the processed identifier of the at least one terminal device.

2. The method according to claim 1, wherein said processing, by the data collection server, the at least one application data corresponding to each of the at least one terminal device to obtain the first data comprises:
   gathering statistics on, or combining, by the data collection server, the at least one application data corresponding to each of the at least one terminal device to obtain the first data.

3. The method according to claim 2, wherein said gathering the statistics on, or combining, by the data collection server, the at least one application data corresponding to each of the at least one terminal device comprises:
   determining, by the data collection server for any application, usage time distribution of the application and/or peak time therein based on usage time of the application corresponding to each of the at least one terminal device.

4. The method according to claim 2, wherein said gathering the statistics on, or combining, by the data collection server, the at least one application data corresponding to each of the at least one terminal device comprises:
   determining, by the data collection server for any time period, an application with a highest or lowest usage frequency in the time period based on usage time of the at least one application corresponding to each of the at least one terminal device.

5. The method according to claim 2, wherein said gathering the statistics on, or combining, by the data collection server, the at least one application data corresponding to each of the at least one terminal device comprises:

determining, the data collection server for any application, a distribution of information on a usage location of the application and/or a peak location therein based on information on a usage location of the application corresponding to each of the at least one terminal device.

6. The method according to claim 2, wherein said gathering the statistics on, or combining, by the data collection server, the at least one application data corresponding to each of the at least one terminal device comprises:

determining, by the data collection server for any location, an application with a highest or lowest usage frequency at the location based on information on a usage location of at least one application corresponding to each of the at least one terminal device.

7. The method according to claim 2, wherein said gathering the statistics on, or combining, by the data collection server, the at least one application data corresponding to each of the at least one terminal device comprises:

combining, by the data collection server for any application, usage time of the application by the at least one terminal device, and/or information on a usage location of the application by the at least one terminal device.

8. The method according to claim 7, further comprising, prior to combining, by the data collection server for any application, the usage time of the application by the at least one terminal device, and/or the information on the usage location of the application by the at least one terminal device:

scrambling, by the data collection server, the usage time of the application and/or the information on the usage location of the application.

9. The method according to claim 7, wherein said combining, by the data collection server for any application, the usage time of the application by the at least one terminal device, and/or the information on the usage location of the application by the at least one terminal device comprises:

calculating, by the data collection server, an average value of the usage time of the application by the at least one terminal device and/or an average value of the information on the usage location of the application by the at least one terminal device.

10. The method according to claim 1, further comprising:

obtaining, by the data collection server, a first identifier of each of the at least one terminal device; and
  processing, by the data collection server, the first identifier of each of the at least one terminal device to obtain a processed identifier of the at least one terminal device.

11. The method according to claim 1, wherein the second identifier of each of the at least one terminal device corresponds to the first identifier of each of the at least one terminal device, respectively.

12. The method according to claim 1, further comprising:

transmitting, by the data collection server, a request message to the terminal device, for requesting the terminal device to transmit the at least one application data.

13. A data collection server, comprising a processor and a memory, wherein the memory has a computer program stored thereon, and the processor is configured to invoke and execute the computer program stored in the memory to perform a wireless communication method, comprising:

receiving, by a data collection server, at least one application data corresponding to each of at least one terminal device, wherein, the at least one application data corresponding to the at least one terminal device is obtained by the at least one terminal device, determining, by the data collection server, a first parameter, wherein the first parameter indicates a scheme for the data collection server to process the at least one application data corresponding to each of the at least one terminal device, or indicates a scheme for the data collection server to process the at least one application data corresponding to each of the at least one terminal device and a first identifier of each of the at least one terminal device, wherein the first parameter is exchanged by the data collection server with a data usage server, such that the data usage server gets a data processing method used by the data collection server, wherein the data usage server is a Network Data Analysis Function (NWDAF) server, processing, by the data collection server, the at least one application data corresponding to each of the at least one terminal device to obtain first data; and transmitting, by the data collection server, the first data to the data usage server, processing, by the data collection server, the first identifier of each of the at least one terminal device to obtain a processed identifier of the at least one terminal device, wherein said processing comprises:

updating, by the data collection server, the first identifier of each of the at least one terminal device to a second identifier of each of the at least one terminal device, wherein the second identifier of each of the at least one terminal device is the processed identifier of the at least one terminal device.

14. The data collection server according to claim 13, wherein the wireless communication method further comprises:

obtaining, by the data collection server, a first identifier of each of the at least one terminal device; and
  processing, by the data collection server, the first identifier of each of the at least one terminal device to obtain a processed identifier of the at least one terminal device.

15. The data collection server according to claim 13, wherein the second identifier of each of the at least one terminal device corresponds to the first identifier of each of the at least one terminal device, respectively.

16. The data collection server according to claim 13, wherein said processing, by the data collection server, the at least one application data corresponding to each of the at least one terminal device to obtain the first data comprises:

gathering statistics on, or combining, by the data collection server, the at least one application data corresponding to each of the at least one terminal device to obtain the first data.

17. The data collection server according to claim 16, wherein said gathering the statistics on, or combining, by the data collection server, the at least one application data corresponding to each of the at least one terminal device comprises:

determining, by the data collection server for any application, usage time distribution of the application and/or peak time therein based on usage time of the application corresponding to each of the at least one terminal device.

18. The data collection server according to claim 16, wherein said gathering the statistics on, or combining, by the data collection server, the at least one application data corresponding to each of the at least one terminal device comprises:

determining, by the data collection server for any time period, an application with a highest or lowest usage frequency in the time period based on usage time of the at least one application corresponding to each of the at least one terminal device.

19. The data collection server according to claim 16, wherein said gathering the statistics on, or combining, by the data collection server, the at least one application data corresponding to each of the at least one terminal device comprises:

determining, the data collection server for any application, a distribution of information on a usage location of the application and/or a peak location therein based on information on a usage location of the application corresponding to each of the at least one terminal device.

20. The data collection server according to claim 13, wherein the method further comprises:

transmitting, by the data collection server, a request message to the terminal device, for requesting the terminal device to transmit the at least one application data.

* * * * *